Nov. 7, 1944.   L. HOPP   2,362,273
PRICE TICKET PROTECTOR
Filed Jan. 28, 1942
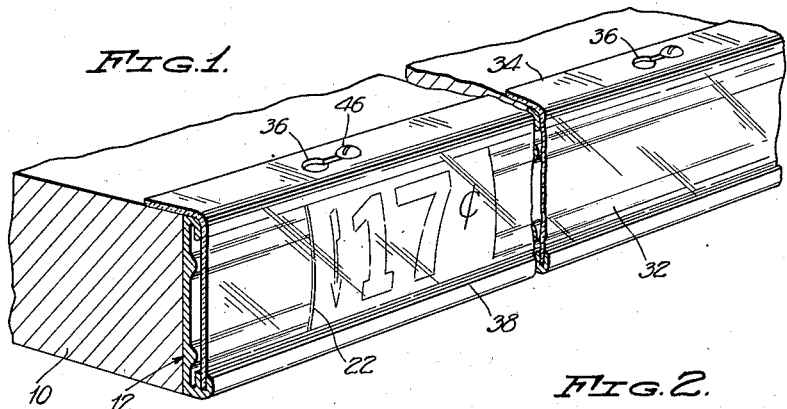
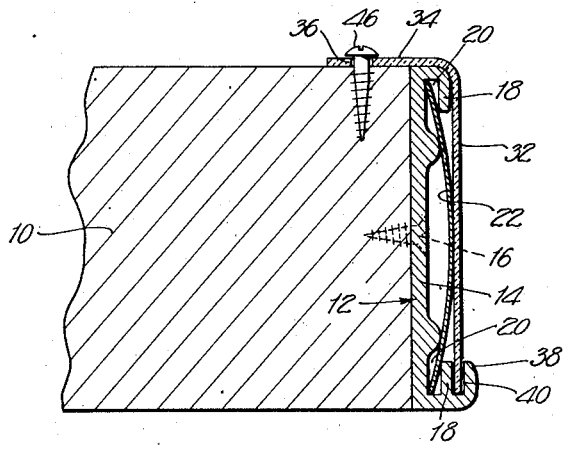
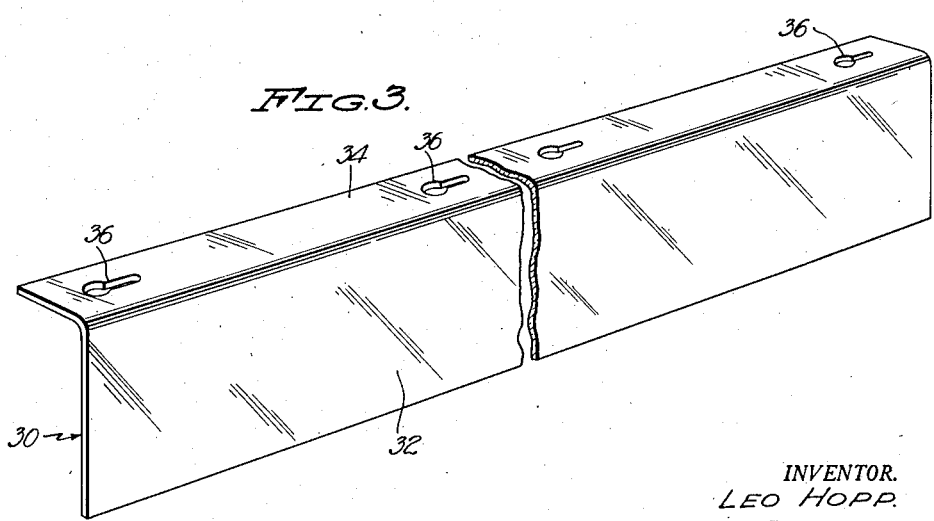
INVENTOR.
LEO HOPP.
BY
ATTORNEYS.

Patented Nov. 7, 1944

2,362,273

UNITED STATES PATENT OFFICE 2,362,273

PRICE TICKET PROTECTOR

Leo Hopp, New York, N. Y., assignor to Herman Hopp, New York, N. Y.

Application January 28, 1942, Serial No. 428,516

2 Claims. (Cl. 40—16)

This invention relates to new and useful improvements in price ticket holders and more particularly it pertains to a protective means for the price tickets carried by the holder.

In many stores and particularly in stores of the self service type, the merchandise is readily accessible to the customers.

In such stores, the price markers are also accessible to the customers and such conditions result in the practice of unscrupulous customers tampering with the price tickets by shifting them and thereby producing false prices for the merchandise upon the shelves.

Also, where the customers pass in close proximity to the price markers, the markers become accidently deranged by tampering on the part of small children accompanying their mothers, by removal of goods from the shelves, by contact of the persons of the shoppers and numerous other causes.

The type of price markers most commonly employed in stores consists of price tickets removably mounted in shelf moldings or holders, and it is particularly to this type of device that the present invention pertains.

It is an object of the present invention to provide a new and novel construction of shelf molding or holder for price tickets which will prevent access to the price tickets by unauthorized persons.

It is a further object of the invention to provide a device of the aforementioned character which will in no way obscure the visibility or display of the price tickets.

It is a further object of the invention to provide a device in which the guard or protective member may be readily removed by authorized persons in order to give access to the price tickets when necessary.

In addition to protecting the price tickets against unauthorized tampering, the device also serves to protect them against becoming soiled or torn, thus preserving a neat and sightly appearance throughout the price marking system.

With the above and other objects in view, reference will be had to the accompanying drawing and the following specification and claims wherein the invention has been illustrated in a price ticket holder of the shelf molding type. It will, however, be obvious that the invention is also applicable to price ticket holders of other types.

In the drawing,

Figure 1 is a perspective view illustrating a fragmentary section of a shelf with a price ticket molding constructed in accordance with the present invention secured thereto, Figure 2 is a transverse sectional view on an enlarged scale taken substantially on the line 2—2 of Figure 1, and Figure 3 is a perspective view partly broken away of the protective member of the device.

In the drawing, the reference character 10 designates a shelf of the type employed in stores for the support of merchandise.

The price ticket holder is designated 12, and it consists of a molding comprising a main body portion 14 secured to the forward edge of the shelf 10 by screws or other suitable fastenings 16.

Defining each of the opposite side edges of the main body portion 14 in spaced relation thereto, there is a ticket retaining flange 18 which construction provides two channels 20 for reception of the price tickets 22. By this construction, the price tickets are removably and slidably mounted relatively to the molding by retention of two opposite edges thereof behind the flanges 18.

Means is provided for preventing unauthorized access to the price tickets and to otherwise protect them against wear and tear incidental to their use.

This protective device consists of a transparent member 30 which comprises a rigid main body portion 32 upon one edge of which there is a rigid longitudinally extending flange 34 disposed preferably in a plane at substantially right angles to the plane of the body portion 32. At spaced intervals, this flange is provided with slots 36 preferably of the keyhole type.

Upon one side edge of the price ticket molding, there is a second flange 38 which is spaced slightly from its respective flange 18 to form a channel 40 therebetween, the purpose of which will be hereinafter specifically described.

In the present illustration of the invention, the price ticket molding is shown as having its body portion of a width equal to the thickness of shelf 10, but it will be obvious that this need not necessarily be true so long as that edge of the price ticket molding which has the single flange 18 is flush with that surface of the shelf to which the protective member 32 is to be attached.

The body portion 32 of the protective member 30 is of such width that when the free side edge thereof is positioned in the channel 40 formed by the spaced flanges 18 and 38, the flange 34 of the protective member 30 will rest upon the upper face of the shelf 10 as illustrated in Figures 1 and 2.

Arranged in spaced relation along the shelf 10 at proper intervals to register with the larger portions of the keyhole slots 36, there are headed fastenings 46 herein illustrated as screws.

By this construction it will be apparent that after the price tickets have been arranged in the molding, the free edge of the protective member 30 may be inserted in the channel 40 with the larger portions of the keyhole slots receiving the heads of the fastenings 46. If now the protective member be slid longitudinally of the price ticket molding, the reduced portions of the keyhole slots will pass beneath the heads of the fastenings to secure the protective member in position.

While in the present illustration of the invention the protective member has been shown as secured to the top face of a shelf, it will be obvious that by a reversal of the price ticket molding, the protective member could be secured to the under face of the shelf with equal results.

Also in certain instances, the body portion of the price ticket molding could be made sufficiently thick to accommodate the fastenings 46, in which case the protective member would be attached to the price ticket molding in lieu of to the shelf. Such a construction would be particularly adaptable to price ticket holders for use with bins or merchandise carriers other than shelves.

From the foregoing, it will be apparent, that the present invention provides a price ticket holder in which the price tickets are protected against tampering by unauthorized persons by transparent means through which they are readily visible, which transparent means is readily removable by authorized persons for the purpose of rearranging the price tickets.

While as above stated that the protective device is readily removable, it is to be understood that they are generally constructed in relatively long lengths thus rendering them impossible of removal by unauthorized persons without detection by store attendants.

Having thus described my invention, what I claim to be new is:

1. In a device of the character described in combination, a price ticket molding comprising a body portion adapted to be fixedly secured to the edge of a shelf, price ticket retaining flanges extending along opposite edges of the body portion, a second retaining flange extending along one edge of the body portion in spaced relation with one of said price ticket retaining flanges to form therewith a protector receiving groove, and a price ticket protector comprising a rigid transparent member extending across the face of the molding and having a free edge positioned in said protector receiving groove, a flat shelf engaging flange extending substantially at right angle from the other edge of the protector and projecting across the adjacent edge of the molding to overlie the shelf, and means for removably securing the flange to the shelf.

2. A price ticket molding for attachment to the edge of a merchandise supporting shelf comprising in combination, a rigid body portion, a price ticket retaining flange extending along each of the side edges of the body portion, a second flange extending along one side of the body portion in spaced relation to its corresponding price ticket retaining flange, and cooperating therewith to provide a groove extending longitudinally of the edge of the body portion, and a price ticket protector comprising a transparent member adapted to overlie the body portion of the molding with one of its edges positioned in said logitudinally extending groove, a flat shelf engaging flange projecting substantially at right angle from the other edge of the protector, said flange being of a width greater than the thickness of said body portion to overlie a portion of the merchandise supporting shelf, means for securing the molding to the front of a merchandise supporting shelf, and means for securing the price ticket protector to the merchandise supporting shelf, said last means comprising spaced headed screws carried by the shelf engaging spaced key-hole shaped slots provided in the flange which overlies the shelf.

LEO HOPP.